April 2, 1968  W. E. BRENNAN ET AL  3,375,829
REINFORCED GIRDLE
Filed Oct. 18, 1965
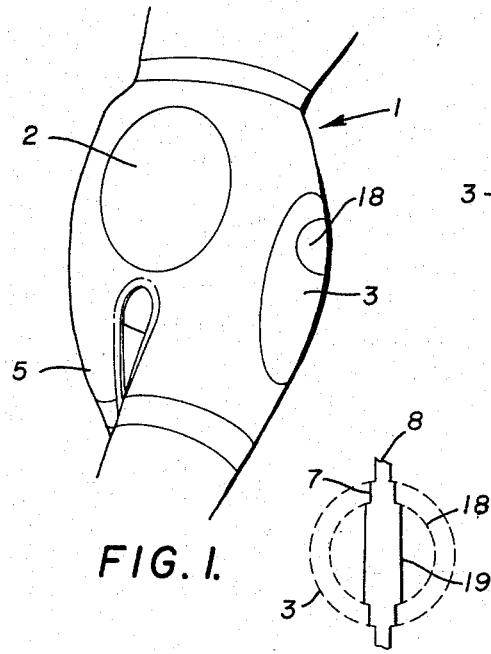
FIG. 1.
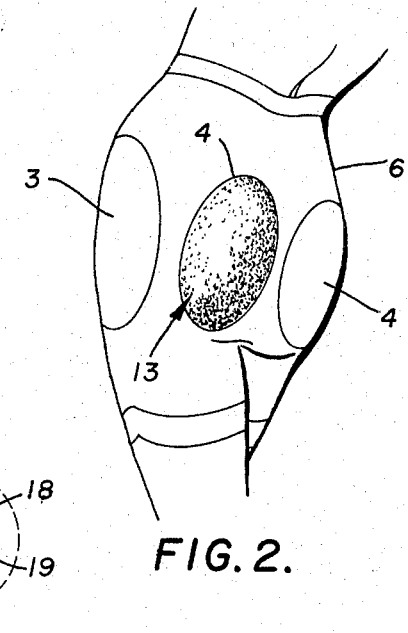
FIG. 2.
FIG. 3a.
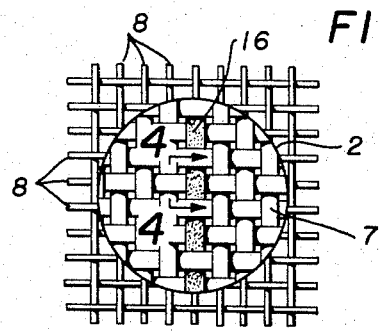
FIG. 3.
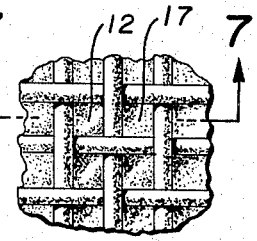
FIG. 6.
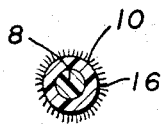
FIG. 4.
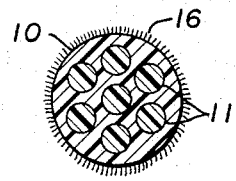
FIG. 5.
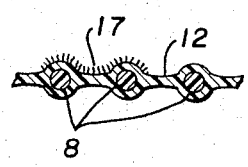
FIG. 7.
INVENTORS
W. E. BRENNAN
J. R. BILES
BY Robert L. Broad Jr.
ATTORNEY

United States Patent Office 3,375,829
Patented Apr. 2, 1968

3,375,829
REINFORCED GIRDLE
Wendell E. Brennan, Decatur, and James R. Biles, Athens, Ala., assignors to Monsanto Company, St. Louis, Mo., a corporation of Delaware
Filed Oct. 18, 1965, Ser. No. 497,094
1 Claim. (Cl. 128—539)

ABSTRACT OF THE DISCLOSURE

A girdle comprised of a universal stretch material having reinforced areas which have been impregnated with a resin in such a way as to limit stretch and also provide for breathing and porous qualities.

This invention is related to improvements in girdles formed of materials having universal or all-way stretch characteristics. More specifically it deals with applying a plastic to a girdle for purposes of reinforcing and limiting stretch.

Heretofore, limiting stretch in prescribed areas of a foundation garment has been accomplished in a number of ways, such as, laminating with a similar fabric by sewing or using ultrasonic waves, vulcanizing a deposit or patch of latex on one side of the fabric, or spraying one side with vulcanized latex. Along these lines, U.S. Patents 2,196,492 and 3,124,137 are considered to be very pertinent.

It is an object of this invention to retain the porous or breathing qualities of universal stretch girdle material in reinforced areas.

Another object of this invention is to provide stretch resistance without bumps or lumps and without regard to the side to which the plastic is applied to the girdle material.

Still another object of this invention is to provide an inexpensive girdle having stretch resistant qualities in prescribed areas.

Further, it is an object of this invention to prevent the tearing or unraveling experienced in sewn or glued laminated girdles.

It is still another object of this invention to provide a girdle which is uniform in appearance and smoothness. The results of laminating or vulcanizing a patch upon a girdle are non-uniformness and marked flesh.

It is another object of this invention to provide a girdle which is comfortable and which requires no flocking in areas where the plastic is applied. Although flocking is not required, it may be added if desired.

In accordance with the present invention a girdle is treated with a plastic such as latex, resin, etc. After said treatment, the stretch of the girdle material is reduced. Particular areas, or the entire girdle may be affected in this way.

Other and further objects and advantages of the invention will more fully appear from the following detailed description taken in conjunction with the accompanying drawing, in which:

FIGURE 1 is a front perspective view of a knitted or woven garment embodying the invention, as applied to a wearer;

FIGURE 2 is a back perspective view of a knitted or woven garment embodying the invention, as applied to a wearer;

FIGURE 3 is an enlarged elevation of a fragmentary section of the garment encompassing portions 2, 3, or 4 in FIGURES 1 and 2 and including a small area outside the periphery or outline thereof;

FIGURE 3A is an enlarged elevation of a fragmentary section encompassing portions 3 and 18 of FIGURE 1 and including a small area outside the periphery or outline thereof;

FIGURE 4 is an enlarged fragmentary diagrammatic sectional view taken substantially along line 4—4 of FIGURE 3.

FIGURE 5 is an enlarged view of FIGURE 4 showing the individual filaments or fibers which make up the yarn or threads in the girdle.

FIGURE 6 is an elevation of a fragmentary section of the garment similar in character to that represented by FIGURE 3.

FIGURE 7 is a fragmentary diagrammatic sectional view of a second embodiment taken substantially along line 7—7 of FIGURE 6.

Like reference characters refer to like parts in the different figures.

With reference to the drawings, the material or fabric embodying the invention is shown as incorporated in a girdle 1, which may be made of or include yarn which is elastic in character and which provides for the material having universal or all-way stretch. The material or fabric may be of the molded, woven, knitted, etc. type, and may be comprised of synthetic and/or natural products.

In accordance with all embodiments of the present invention, portions or areas such as 2, 3, and 4 (FIGS. 1 and 2) are sprayed, brushed, painted, etc., with a plastic to reduce stretch. The strands of yarn comprising these areas are totally impregnated with the plastic. This will be brought out more thoroughly later.

The plastic used is resilient and of a suitable quality so as to provide anti-stretch and not harm the girdle material or fabric. The plastic which is applied to the girdle material may comprise such bonding agents as Bostik 7070 (polyurethane), Zytel nylon resin (polyamide), Acryloid K–7003 and K–7004 (acrylic ester polymers), etc. It may be desirable to make use of more than one type of plastic in a given area or different areas.

It is known that certain prescribed areas on a girdle should not stretch as much as others in other that favorable results are obtained. These areas may be the same as those represented by 2, 3, or 4, or any others as desired.

It may be desirable to provide areas which are not only stretch resistant and eliminate unwanted lumps, but which add preferable lumps and curves. In other words, it may be advantageous to eliminate an undersirable lump and at the same time produce a desirable one. This may be effected by applying several coats of plastic to a given area.

After the plastic is applied to the girdle, it may be cured in any number of ways. Normal evaporation is usually suitable, although heat may be required for some water base plastics.

With regard to the impregnation of the girdle material with a plastic, reference is made to FIGS. 3, 4 and 5. It may be seen from FIGS. 3 and 4 that when an area 2 is impregnated the diameter of the yarn increases to a certain extent. This is caused due to the yarn becoming coated.

As additional plastic is applied to a given area, the diameter or size of the yarn increases. This is illustrated in FIG. 3A where an area 3 is impregnated, and an area 18, which is within 3, is subjected to additional impregnation. Now there is the untreated yarn 8 (outside area 3), the enlarged portion 7 of yarn 8 (within area 3), and the enlarged portion 19 of yarn 8 (within area 18).

Also, the result of additional applications of plastic to a given area is further reduction in the stretch of the material in said area.

If enough plastic is applied to a given area, a protuberance or lump is produced. Thus, the presented shape of the girdle wearer can be changed.

In the preferred embodiment the material is not only totally impregnated, but remains completely porous. The interstices between the strands of yarn remain.

Further, in the preferred embodiment the stretch reducing action is upon each individual strand of yarn as opposed to two or more strands of yarn. There is no overall coating and bonding which results in one yarn acting relative to another. Each yarn acts independently of every other yarn.

In another embodiment illustrated in FIGS. 6 and 7 the individual strands of yarn are totally impregnated and a film or web 12 of plastic connecting the strands of yarn is formed. In this embodiment, the area affected is not porous (unless the material is subjected to excessive stretch). It is to be understood that this is not a coating on one side or the other of the girdle fabric (or on both sides), but is a film which exists within the interstices causing coaction and interaction of the various threads relative to one another. In this embodiment flocking may be desirable, but is not necessary.

Flocking is usually employed for design purposes, for providing a softer surface, to provide a garment which is easier to slip into, and/or to absorb moisture. Any impregnated area such as 4 in FIG. 2 may be provided with flocking generally denoted by 13. The embodiment represented by FIGS. 3, 4, and 5 illustrates that flocking 16 is applied to the individual strands of yarn 8. In the embodiment represented by FIGS. 6 and 7, flocking 17 is applied to the webs 12 and the strands of yarn 8.

The enlarged portion 7 of yarn 8 is best illustrated in FIG. 4, where 10 is the coating due to impregnation.

To get a better view of the extent of impregnation, attention is directed to FIG. 5 where yarn 8 is shown to be comprised of filaments 11. It can be seen that the individual filaments are completely surrounded and coated with the plastic.

Whether a web is to be formed or the material is to remain porous, the yarn which makes up the material is totally impregnated.

It will be apparent from the foregoing that an improved article has been provided by the invention. It is to be understood that various modifications of the invention and adaptations thereof to other articles may be made or resorted to without departing from the spirit and scope of the appended claim.

What is claimed is:

1. A girdle being substantially uniform in smoothness and appearance comprising a universal stretch material having reinforced areas of reduced stretchability which are completely porous, said areas being comprised of strands of yarn which have been totally impregnated with a plastic, which have had their individual stretch reduced, and which act independently of one another.

References Cited

UNITED STATES PATENTS

| | | | |
|---|---|---|---|
| 2,196,492 | 4/1940 | Clark et al. | 128—580 |
| 2,413,970 | 1/1947 | Hawley | 161—76 |
| 2,739,919 | 3/1956 | Artzt | 156—232 |

ADELE M. EAGER, *Primary Examiner.*